United States Patent
Jin et al.

(10) Patent No.: US 11,978,241 B2
(45) Date of Patent: May 7, 2024

(54) IMAGE PROCESSING METHOD AND APPARATUS, COMPUTER-READABLE MEDIUM, AND ELECTRONIC DEVICE

(71) Applicant: TENCENT TECHNOLOGY (SHENZHEN) COMPANY LTD, Shenzhen (CN)

(72) Inventors: Kun Jin, Shenzhen (CN); Shi Jie Zhao, Shenzhen (CN); Yang Yi, Shenzhen (CN); Feng Li, Shenzhen (CN); Xiao Xiang Zuo, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 487 days.

(21) Appl. No.: 17/352,822

(22) Filed: Jun. 21, 2021

(65) Prior Publication Data
US 2021/0319243 A1    Oct. 14, 2021

Related U.S. Application Data

(63) Continuation of application No. PCT/CN2020/085021, filed on Apr. 16, 2020.

(30) Foreign Application Priority Data

May 6, 2019    (CN) .......................... 201910369974.X

(51) Int. Cl.
*G06K 9/00*    (2022.01)
*G06F 18/10*    (2023.01)
*G06F 18/213*    (2023.01)
*G06F 18/214*    (2023.01)
(Continued)

(52) U.S. Cl.
CPC ............ *G06V 10/454* (2022.01); *G06F 18/10* (2023.01); *G06F 18/213* (2023.01);
(Continued)

(58) Field of Classification Search
CPC .... G06V 10/454; G06V 10/25; G06V 10/771; G06V 10/82; G06T 7/11;
(Continued)

(56) References Cited

FOREIGN PATENT DOCUMENTS

| CN | 107169090 A | 9/2017 |
|---|---|---|
| CN | 107577758 A | 1/2018 |

(Continued)

OTHER PUBLICATIONS

Ajjaji, Dalal A., et al. "Multi-instance neural network architecture for scene classification in remote sensing." 2019 International Conference on Computer and Information Sciences (ICCIS). IEEE, 2019. (Year: 2019).*

(Continued)

*Primary Examiner* — Jonathan S Lee
(74) *Attorney, Agent, or Firm* — Sughrue Mion, PLLC

(57) ABSTRACT

Embodiments of the disclosure provide an image processing method and apparatus, a computer-readable medium, and an electronic device. The image processing method includes: extracting a feature map of a target image; dividing the feature map into target regions; determining weights of the target regions according to feature vectors of the target regions; and generating a feature vector of the target image according to the weights of the target regions and the feature vectors of the target regions.

15 Claims, 6 Drawing Sheets

Perform dimension reduction on the feature vectors of the target regions, to obtain feature scalars corresponding to the target regions — S310

Normalize the feature scalars corresponding to the target regions, to obtain the weights of the target regions — S320

(51) Int. Cl.
    G06T 7/11      (2017.01)
    G06V 10/25     (2022.01)
    G06V 10/44     (2022.01)
    G06V 10/771    (2022.01)
    G06V 10/82     (2022.01)
(52) U.S. Cl.
    CPC .............. *G06F 18/214* (2023.01); *G06T 7/11*
            (2017.01); *G06V 10/25* (2022.01); *G06V*
            *10/771* (2022.01); *G06V 10/82* (2022.01);
                        *G06T 2207/20021* (2013.01); *G06T*
                        *2207/20081* (2013.01)
(58) Field of Classification Search
    CPC . G06T 2207/20021; G06T 2207/20081; G06F
                  18/10; G06F 18/214; G06F 18/213
    USPC ......................................................... 382/173
    See application file for complete search history.

(56) References Cited

FOREIGN PATENT DOCUMENTS

| | | |
|---|---|---|
| CN | 108171260 A | 6/2018 |
| CN | 108229468 A | 6/2018 |
| CN | 110222220 A | 9/2019 |
| JP | 2010-211484 A | 9/2010 |
| JP | 2012-079186 A | 4/2012 |
| WO | 2019/001481 A1 | 1/2019 |

OTHER PUBLICATIONS

Park, Byung-Hwa, Se-Young Oh, and Ig-Jae Kim. "Face alignment using a deep neural network with local feature learning and recurrent regression." Expert Systems with Applications 89 (2017): 66-80. (Year: 2017).*

Zhao, Wei, et al. "Superpixel-based multiple local CNN for panchromatic and multispectral image classification." IEEE Transactions on Geoscience and Remote Sensing 55.7 (2017): 4141-4156. (Year: 2017).*

Chaudhary, Manoj D., and Abhay B. Upadhyay. "Fusion of local and global features using stationary wavelet transform for efficient content based image retrieval." 2014 IEEE Students' Conference on Electrical, Electronics and Computer Science. IEEE, 2014. (Year: 2014).*

Li, Jianheng, et al. "Fast person search pipeline." 2019 IEEE International Conference on Multimedia and Expo (ICME). IEEE, 2019. (Year: 2019).*

Sun, Xinzi, et al. "People re-identification by multi-branch cnn with multi-scale features." 2019 IEEE International Conference on Image Processing (ICIP). IEEE, 2019. (Year: 2019).*

Translation of Written Opinion of the International Searching Authority dated Jul. 16, 2020 in International Application No. PCT/CN2020/085021.

Extended European Search Report dated Jun. 2, 2022 in European Application No. 20801637.8.

Takayoshi Yamashita, "All Illustrated Guide to Deep Learning", second revised version, Kodansha, Nov. 19, 2018, pp. 95-125 (33 pages total).

Office Action dated Jul. 11, 2022 from the Japanese Patent Office in JP Application No. 2021-542181.

International Search Report for PCT/CN2020/085021 dated Jul. 16, 2020 (PCT/ISA/210).

Written Opinion of the International Searching Authority for PCT/CN2020/085021 (PCT/ISA/237).

* cited by examiner

| To-be-retrieved image | 5th retrieved image | 10th retrieved image | 20th retrieved image | 30th retrieved image |

IMAGE PROCESSING METHOD AND APPARATUS, COMPUTER-READABLE MEDIUM, AND ELECTRONIC DEVICE

CROSS-REFERENCE TO RELATED APPLICATION(S)

This application is a bypass continuation application of International Application No. PCT/CN2020/085021, filed on Apr. 16, 2020, which claims priority to Chinese Patent Application No. 201910369974.X, filed on May 6, 2019, with China National Intellectual Property Administration, the disclosures of which are herein incorporated by reference in their entireties.

FIELD

The disclosure relates to the field of computer and communication technologies, and particularly, to an image processing method and apparatus, a computer-readable medium, and an electronic device.

BACKGROUND

In the field of image processing, for example, in technologies of image retrieval and image recognition, a feature vector extracted from an image greatly affects accuracy of an image processing result. A feature extraction manner provided in the related art has low inaccuracy of an extracted feature vector, which impacts on a final image processing result.

SUMMARY

Embodiments of the disclosure provide an image processing method and apparatus, a computer-readable medium, and an electronic device, to improve accuracy and appropriateness (or quality) of a determined image feature vector.

Other features and advantages of the disclosure become obvious through the following detailed descriptions, or may be partially learned through the practice of the disclosure.

According to an aspect of the embodiments of the disclosure, an image processing method for image recognition is provided, including: extracting a feature map of a target image; dividing the feature map into target regions; determining weights of the target regions according to feature vectors of the target regions; and generating a feature vector of the target image according to the weights of the target regions and the feature vectors of the target regions, the feature vector being used for image recognition of the target image.

According to an aspect of the embodiments of the disclosure, an image processing method for image recognition is provided, including: inputting a target image into an image processing model, the image processing model including a convolution module, a visual attention module, and a feature combination module, the convolution module being configured to extract a feature map of the target image, the visual attention module being configured to: divide the feature map into target regions, and determine weights of the target regions according to feature vectors of the target regions, and the feature combination module being configured to generate a feature vector of the target image according to the weights of the target regions and the feature vectors of the target regions; and obtaining the feature vector of the target image that is generated by the image processing model, the feature vector being used for image recognition of the target image.

According to an aspect of the embodiments of the disclosure, an image processing apparatus for image recognition is provided, including: at least one memory configured to store program code; and at least one processor configured to read the program code and operate as instructed by the program code, the program code including: extraction code configured to cause the at least one processor to extract a feature map of a target image; division code configured to cause the at least one processor to divide the feature map into target regions; a determining code configured to cause the at least one processor to determine weights of the target regions according to feature vectors of the target regions; and generation code configured to cause the at least one processor to generate a feature vector of the target image according to the weights of the target regions and the feature vectors of the target regions, the feature vector being used for image recognition of the target image.

In some embodiments of the disclosure, based on the foregoing solution, the division code is configured to cause the at least one processor to: divide the feature map in a predetermined region division manner, to obtain the target regions; or perform a region of interest (ROI) pooling operation on the feature map, to map ROIs to the feature map to obtain the target regions.

In some embodiments of the disclosure, based on the foregoing solution, the division code is configured to cause the at least one processor to: divide the feature map in one or more predetermined region division manners, to obtain feature map regions corresponding to the region division manners; and use the feature map regions corresponding to the region division manners as the target regions.

In some embodiments of the disclosure, based on the foregoing solution, the determining code is configured to cause the at least one processor to: perform dimension reduction on the feature vectors of the target regions, to obtain feature scalars corresponding to the target regions; and normalize the feature scalars corresponding to the target regions, to obtain the weights of the target regions.

In some embodiments of the disclosure, based on the foregoing solution, the determining code is configured to cause the at least one processor to: input the feature vectors of the target regions into a fully connected layer of which an output dimension is one dimension, and determine the feature scalars corresponding to the target regions according to an output of the fully connected layer.

In some embodiments of the disclosure, based on the foregoing solution, the generation code is configured to cause the at least one processor to: calculate weighted feature vectors of the target regions according to the weights of the target regions and the feature vectors of the target regions; and generate the feature vector of the target image according to the weighted feature vectors of the target regions.

In some embodiments of the disclosure, based on the foregoing solution, the generation code is configured to cause the at least one processor to: combine the weighted feature vectors of the target regions, to obtain the feature vector of the target image; or combine the weighted feature vectors of the target regions, and normalize feature vectors after the combination, to obtain the feature vector of the target image.

In some embodiments of the disclosure, based on the foregoing solution, the program code further includes: retrieval code configured to cause the at least one processor to retrieve, according to the feature vector of the target image, an image matching the target image.

According to an aspect of the embodiments of the disclosure, an image processing apparatus for image recognition is provided, including: processing code configured to cause the at least one processor to input a target image into an image processing model, the image processing model including a convolution module, a visual attention module, and a feature combination module, the convolution module being configured to extract a feature map of the target image, the visual attention module being configured to: divide the feature map into target regions, and determine weights of the target regions according to feature vectors of the target regions, and the feature combination module being configured to generate a feature vector of the target image according to the weights of the target regions and the feature vectors of the target regions; and obtaining code configured to cause the at least one processor to obtain the feature vector of the target image that is generated by the image processing model, the feature vector being used for image recognition of the target image.

In some embodiments of the disclosure, based on the foregoing solution, the program code further includes: training code configured to cause the at least one processor to obtain an image sample labeled with a feature vector; and train the image processing model by using the image sample.

In some embodiments of the disclosure, based on the foregoing solution, the processing code is configured to cause the at least one processor to extract the feature map of the target image by using any convolutional layer in the convolution module.

According to an aspect of the embodiments of the disclosure, a non-transitory computer-readable medium is provided, storing a computer program, the computer program being executable by at least one processor to perform the image processing method according to the foregoing embodiment(s).

According to an aspect of the embodiments of the disclosure, an electronic device is provided, including: at least one processor; and at least one memory configured to store program code, the program code being executable by the at least one processor to perform the image processing method according to the foregoing embodiment(s).

BRIEF DESCRIPTION OF THE DRAWINGS

Accompanying drawings herein are incorporated into the specification and constitute a part of this specification, show example embodiments of the disclosure, and are used for describing an inventive concept of the disclosure together with this specification. The accompanying drawings described below are merely some embodiments of the disclosure, and a person of ordinary skill in the art may further obtain other accompanying drawings according to the accompanying drawings without creative efforts.

DETAILED DESCRIPTION

Example implementations will now be described with reference to the accompanying drawings. However, the example implementations may be implemented in various forms, and are not to be understood as being limited to the examples described herein. Instead, the implementations are provided to make the disclosure more thorough and complete and fully convey the idea of the example implementations to a person skilled in the art.

In addition, the described features, structures or characteristics may be combined in one or more embodiments in any appropriate manner. In the following descriptions, specific details are provided to give a comprehensive understanding of the embodiments of the disclosure. However, a person of ordinary skill in the art is to be aware that, the technical solutions in the disclosure may be implemented without one or more of the particular details, or another method, unit, apparatus, or operation may be used. In other cases, well-known methods, apparatuses, implementations, or operations are not shown or described in detail, in order not to obscure the aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples, do not need to include all content and operations/steps, and do not need to be performed in the described orders either. For example, some operations/steps may be further divided, while some operations/steps may be combined or partially combined. Therefore, an actual execution order may change according to an embodiment.

Figure 1:
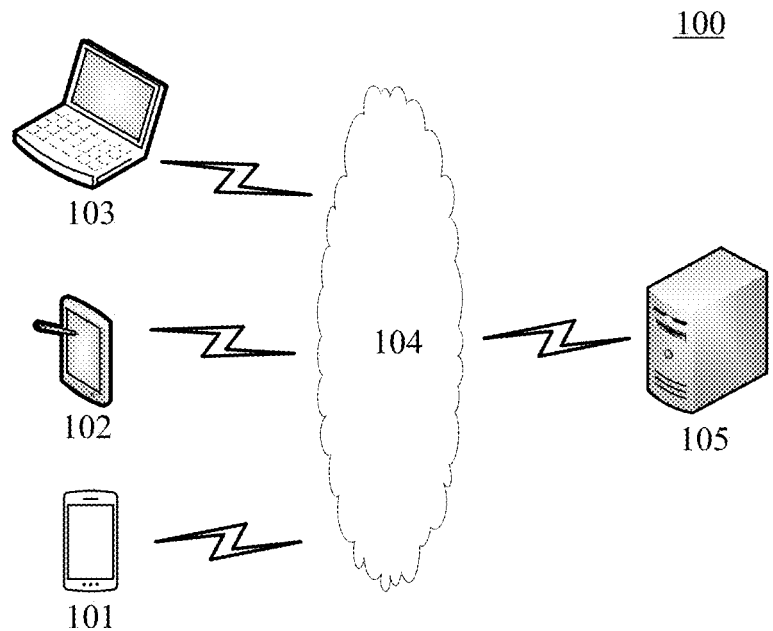
FIG. 1 shows a schematic diagram of an example system architecture to which a technical solution according to an embodiment of the disclosure is applicable.

FIG. 1 shows a schematic diagram of an example system architecture to which a technical solution according to an embodiment of the disclosure is applicable.

As shown in FIG. 1, the system architecture may include a terminal device (which may be any one or more of a smart phone 101, a tablet computer 102, and a portable computer 103 shown in FIG. 1, or may be any other type of a terminal device such as a desktop computer, and the like), a network 104, and a server 105. The network 104 is configured to provide a medium of a communication link between the terminal device and the server 105. The network 104 may include various connection types, for example, a wired communication link and a wireless communication link.

It is to be understood that the quantities of terminal devices, networks, and servers in FIG. 1 are merely examples. There may be any quantities of terminal devices, networks, and servers according to an implementation requirement. For example, the server 105 may be a server cluster including a plurality of servers.

In an embodiment of the disclosure, a user may specify a to-be-processed image (or target image) by using a terminal device (the smart phone 101, the tablet computer 102, or the portable computer 103 shown in FIG. 1). For example, the user transmits a target image to the server 105 by using the terminal device, or the user selects, by using the terminal device, a target image from images provided by the server 105.

In an embodiment of the disclosure, after determining the target image, the server 105 may extract a feature map of the target image. For example, the server may extract a feature map of the target image by using any convolutional layer in a convolutional neural network (CNN) model. After the feature map of the target image is extracted, the feature map may be divided into a plurality of target regions; subsequently weights of the target regions are determined according to feature vectors of the target regions; and then a feature vector of the target image may be generated according to the weights of target regions and the feature vectors of the target regions. According to the technical solution of the example embodiments of the disclosure, when the feature vector of the image is determined, the target regions may be weighted according to the feature vectors of the target regions in the image, so that a non-salient region in the image may be weakened, and a salient region in the image may be highlighted, thereby effectively improving accuracy and appropriateness (or quality) of the generated feature vector of the image, and improving an image processing effect, for example, improving an image retrieval effect and accuracy in image recognition.

The image processing method provided in the embodiments of the disclosure may be performed by the server 105, and correspondingly, an image processing apparatus may be disposed in the server 105. However, in another embodiment of the disclosure, the terminal device may have functions similar to those of the server, so as to perform an image processing solution provided in the embodiments of the disclosure.

The implementation details of the technical solutions in the embodiments of the disclosure are described below in detail.

Figure 2:
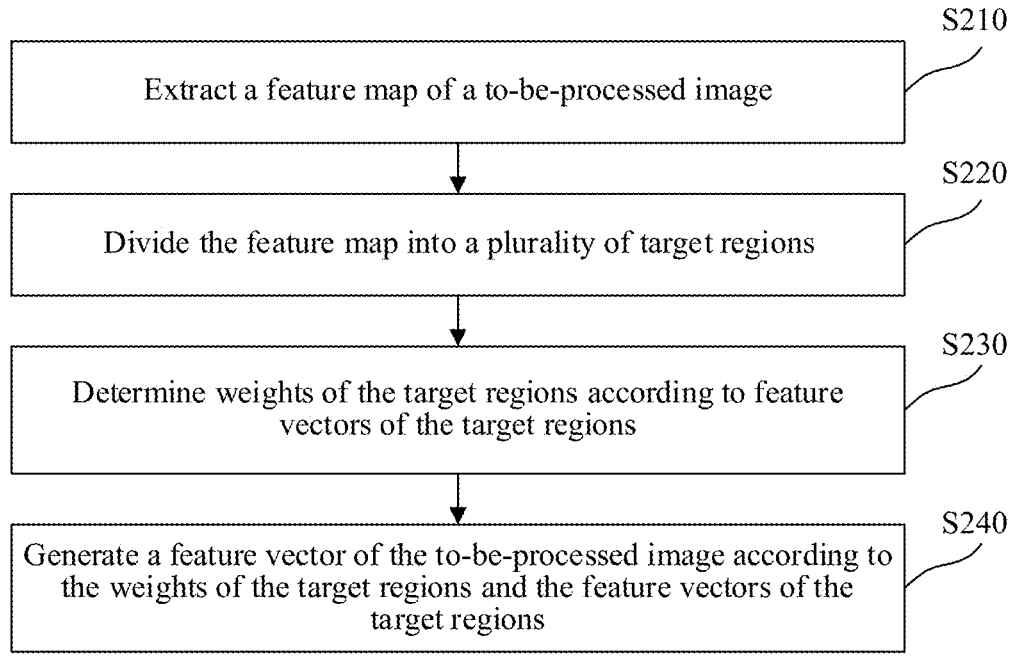
FIG. 2 shows a flowchart of an image processing method according to an embodiment of the disclosure.

FIG. 2 shows a flowchart of an image processing method according to an embodiment of the disclosure. The image processing method may be performed by a device having a computing processing function, for example, the server 105 shown in FIG. 1. Referring to FIG. 2, the image processing method includes at least operations S210 to S240, which are described below in detail:

In operation S210, a server extracts a feature map of a to-be-processed image (or target image).

In an embodiment of the disclosure, the target image may be an image from which a feature vector needs to be extracted, an image that needs to be retrieved, an image that needs to be recognized, or the like.

In an embodiment of the disclosure, a feature map of the target image may be extracted by using any convolutional layer in a CNN model.

In operation S220, the server divides the feature map into a plurality of target regions.

In an embodiment of the disclosure, the feature map of the target image may be divided in a predetermined region division manner, to obtain the plurality of target regions. For example, one or more region division manners may be predetermined (for example, three region division manners are predetermined), then the feature map is divided in the one or more region division manners, to obtain feature map regions corresponding to the one or more region division manners (or feature map regions obtained by division), and the feature map regions corresponding to the one or more region division manners are used as target regions obtained through division.

In an embodiment of the disclosure, a size of an output feature map of a region of interest (ROI) pooling operation may alternatively be set, and then an ROI pooling operation is performed on the feature map of the target image, to map ROIs to the feature map of the target image so as to obtain a plurality of target regions.

Still referring to FIG. 2, in operation S230, the server determines weights of the target regions according to feature vectors of the target regions.

Figure 3:
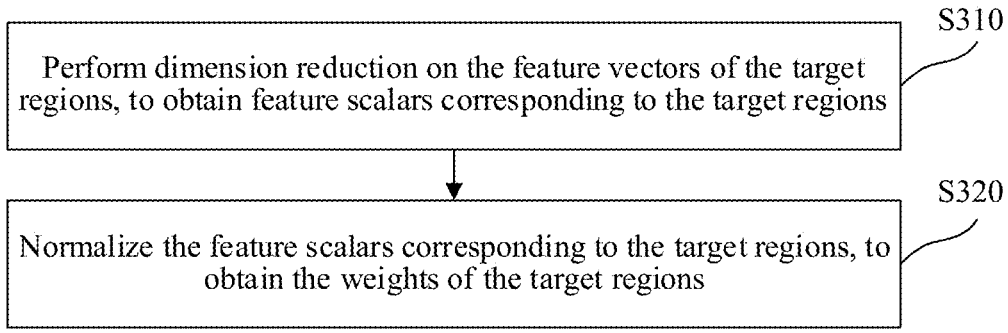
FIG. 3 shows a flowchart of determining weights of target regions according to an embodiment of the disclosure.

FIG. 3 shows a flowchart of determining weights of target regions according to an embodiment of the disclosure. In an embodiment of the disclosure, as shown in FIG. 3, a process of determining the weights of the target regions in operation S230 may include operation S310 and operation S320 as follows:

In operation S310, the server performs dimension reduction on the feature vectors of the target regions, to obtain feature scalars corresponding to the target regions.

In an embodiment of the disclosure, the feature scalars are physical quantities used for representing sizes of features. For example, the feature vectors of the target regions may be inputted into a fully connected layer of which an output dimension is one dimension, to determine the feature scalars corresponding to the target regions according to an output of the fully connected layer.

In operation S320, the server normalizes the feature scalars corresponding to the target regions, to obtain the weights of the target regions.

In an embodiment of the disclosure, the feature scalars corresponding to the target regions may be normalized by using an L1 norm, an L2 norm, or a softmax function (referred to as a normalized exponential function).

According to the technical solution of the example embodiment shown in FIG. 3, the weights of the target regions may be determined according to the feature vectors of the target regions, and then a non-salient region (for example, a background region) in the image may be weakened by using the determined weights, and a salient region (for example, a foreground region) in the image may be highlighted, thereby improving accuracy and appropriateness of the generated feature vector of the image.

Still referring to FIG. 2, in operation S240, the server generates a feature vector of the target image according to the weights of the target regions and the feature vectors of the target regions.

Figure 4:
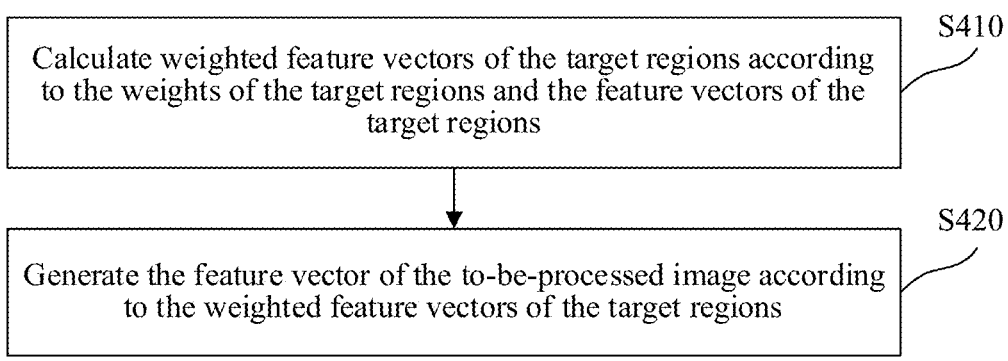
FIG. 4 shows a flowchart of generating a feature vector of a target image according to weights of target regions and feature vectors of the target regions according to an embodiment of the disclosure.

FIG. 4 shows a flowchart of generating a feature vector of a target image according to weights of target regions and feature vectors of the target regions according to an embodiment of the disclosure. In an embodiment of the disclosure, as shown in FIG. 4, the process of generating a feature vector of the target image according to the weights of the target regions and the feature vectors of the target regions in operation S240 may include operation S410 and operation S420 as follows:

In operation S410, the server calculates weighted feature vectors of the target regions according to the weights of the target regions and the feature vectors of the target regions.

In an embodiment of the disclosure, the weights of the target regions may be dot-multiplied by the feature vectors of the target regions (that is, a scalar product is calculated), to obtain weighted feature vectors of the target regions.

In operation S420, the server generates the feature vector of the target image according to the weighted feature vectors of the target regions.

In an embodiment of the disclosure, the weighted feature vectors of the target regions may be combined, to obtain the feature vector of the target image. Alternatively, after the weighted feature vectors of the target regions are combined, feature vectors after the combination may be normalized (for example, be normalized by using an L2 norm), to obtain the feature vector of the target image.

Based on the technical solution of the embodiment shown in FIG. 2, in an embodiment of the disclosure, after the feature vector of the target image is obtained, an image matching the target image may be retrieved according to the feature vector of the target image, or image recognition is further performed based on the feature vector.

According to the technical solutions of the example embodiments shown in FIG. 2 to FIG. 4, when the feature vector of the image is determined, the target regions may be weighted according to the feature vectors of the target regions in the image, so that a non-salient region in the image may be weakened, and a salient region in the image may be highlighted, thereby effectively improving accuracy and appropriateness of the generated feature vector of the image, improving an image retrieval effect, and also improving an image recognition effect.

Figure 5:
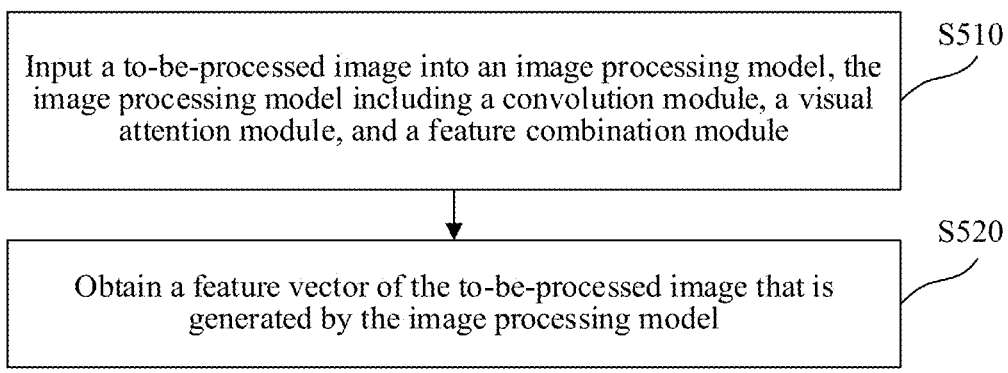
FIG. 5 shows a flowchart of an image processing method according to an embodiment of the disclosure.

FIG. 5 shows a flowchart of an image processing method according to an embodiment of the disclosure. The image processing method may be performed by a device having a computing processing function, for example, the server 105 shown in FIG. 1. Referring to FIG. 5, the image processing method includes at least operations S510 and S520, which are described below in detail:

In operation S510, a target image is inputted an image processing model, the image processing model including a convolution module, a visual attention module, and a feature combination module. The convolution module is configured to extract a feature map of the target image. The visual attention module is configured to: divide the feature map into a plurality of target regions, and determine weights of the target regions according to feature vectors of the target regions. The feature combination module is configured to generate a feature vector of the target image according to the weights of the target regions and the feature vectors of the target regions.

In an embodiment of the disclosure, the convolution module may be a convolutional neural network, and a feature map of the target image may be extracted by using any convolutional layer in the convolution module.

In an embodiment of the disclosure, the visual attention module may divide the feature map of the target image in a predetermined region division manner, to obtain the plurality of target regions. For example, one or more region division manners may be predetermined, then the feature map is divided in the one or more region division manners, to obtain feature map regions respectively corresponding to the one or more region division manners, and the feature map regions obtained in the one or more region division manners are used as target regions.

In an embodiment of the disclosure, the visual attention module may alternatively set a size of an output feature map of a region of interest (ROI) pooling operation, and then perform an ROI pooling operation on the feature map of the target image, to map ROIs to the feature map of the target image so as to obtain a plurality of target regions.

In an embodiment of the disclosure, a solution in which the visual attention module determines the weights of the target regions according to the feature vectors of the target regions may be similar to the solution shown in FIG. 3 in the foregoing embodiments. Details are not described herein again.

In an embodiment of the disclosure, a solution in which the feature combination module generates a feature vector of the target image according to the weights of the target regions and the feature vectors of the target regions may be similar to the solution shown in FIG. 4 in the foregoing embodiments. Details are not described herein again.

Still referring to FIG. 5, in operation S520, the server obtains the feature vector of the target image that is generated by the image processing model.

In an embodiment of the disclosure, after the feature vector of the target image that is generated by the image processing model is obtained, an image matching the target image may be retrieved according to the feature vector of the target image.

In an embodiment of the disclosure, after the feature vector of the target image that is generated by the image processing model is obtained, the target image may be recognized according to the feature vector of the target image.

In the technical solution of the embodiment shown in FIG. 5, the feature vector of the target image is generated by using the image processing model, and the image processing model is trained in a peer-to-peer training manner while accuracy and appropriateness of the generated feature vector of the image are ensured. Accordingly, the feature vector of the image may be conveniently generated by using the image processing model. In an embodiment of the disclosure, a manner of training the image processing model may be: obtaining an image sample labeled with a feature vector; and train the image processing model by using the image sample, until a loss function of the image processing model converges.

The implementation details of the technical solutions in the embodiments of the disclosure are described below in detail with reference to FIG. 6 to FIG. 10.

Figure 6:
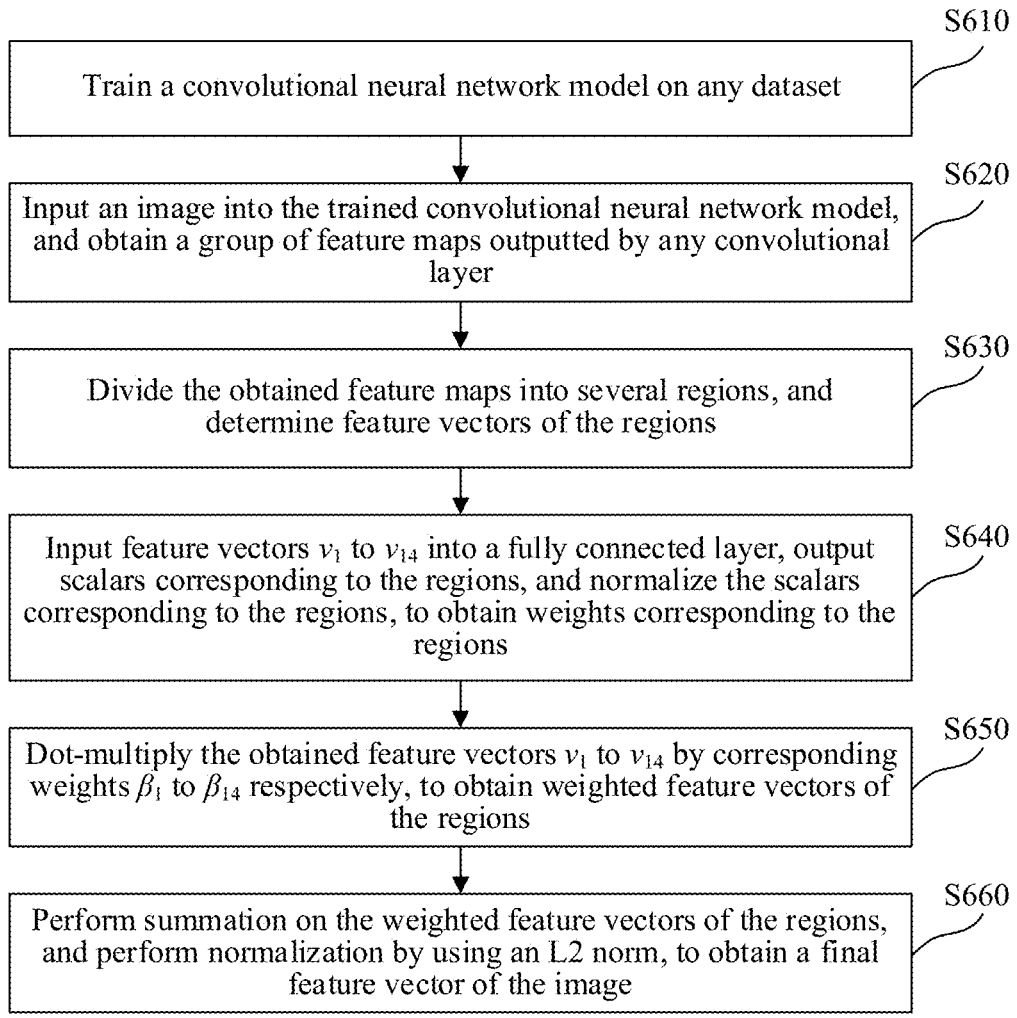
FIG. 6 shows a flowchart of an image processing method according to an embodiment of the disclosure.

FIG. 6 shows a flowchart of an image processing method according to an embodiment of the disclosure. As shown in FIG. 6, the image processing method may include operation S610 to operation S660, which are described in detail as follows:

In operation S610, a server trains a convolutional neural network model on any dataset.

In an embodiment of the disclosure, the convolutional neural network model may be a residual network (ResNet), a ResNeXt, a visual geometry group network (VGGNet), an InceptionNet, or the like.

The training on any dataset may mean that the dataset is used as a training set, to train the convolutional neural network model.

In operation S620, the server inputs an image into the trained convolutional neural network model, and obtains a group of feature maps outputted by any convolutional layer.

In an embodiment of the disclosure, a size of a feature map outputted by the convolutional neural network model may be C×W×H, where C represents a quantity of channels, and H and W respectively represent a length and a width.

When the convolutional neural network model has two or more convolutional layers, the two or more convolutional layers may be parallel. That is, the image is processed by the convolutional layers respectively, to output feature maps corresponding to the convolutional layers, that is, the group of feature maps described above.

In operation S630, the server divides the obtained feature maps into several regions, and determines feature vectors of the regions.

Figure 7:
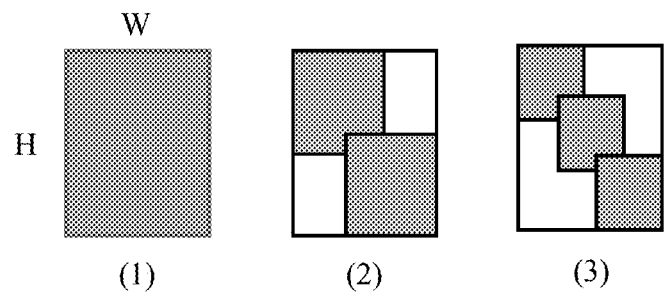
FIG. 7 shows a schematic diagram of region division manners according to an embodiment of the disclosure.

In an embodiment of the disclosure, several regions may be designed for the image in advance, and then a pooling (e.g., max pooling) operation is performed in the regions, to obtain features of the regions. FIG. 7 shows a schematic diagram of region division manners according to an embodiment of the disclosure. As shown in FIG. 7, the part (1) in FIG. 7 indicates that the entire image is regarded as one region, that is, $R_1$; the part (2) in FIG. 7 indicates that the entire image is approximately divided into four regions (to avoid unclearness due to excessive region overlaps, only two regions thereof are shown), an overlap rate between two adjacent regions is set to α (0<α<1), and the four regions are denoted as $R_2$, $R_3$, $R_4$, and $R_5$ respectively; and the part (3) in FIG. 7 indicates that the entire image is approximately divided into nine regions (to avoid unclearness due to excessive region overlaps, only three regions thereof are shown), an overlap rate between two adjacent regions is set to α (0<α<1), and the nine regions are denoted as $R_6$, $R_7$, $R_8$, $R_9$, $R_{10}$, $R_{11}$, $R_{12}$, $R_{13}$, and $R_{14}$ respectively. In an embodiment, the entire image may alternatively be divided into more regions.

In an embodiment of the disclosure, the image may be divided in the three manners shown in FIG. 7, part (1) to part (3), to obtain 14 regions $R_1$ to $R_{14}$. Then a max pooling operation is performed in each region according to a coordinate position of the each region, to determine a feature vector v of the each region.

In an embodiment of the disclosure, a size of an output feature map of an ROI pooling layer may alternatively be set. For example, a size of an output feature map is set to 3×3, and after an input feature map of a size of W×H is inputted into the ROI pooling layer, the output feature map is approximately divided into 3×3 parts on average by using an algorithm. For each part, a maximum value is obtained as an output, to output a 3×3 feature map.

A description is made by using an example in which the foregoing 14 regions $R_1$ to $R_{14}$ are obtained. Feature vectors of the 14 regions are $v_1$ to $v_{14}$ respectively. A dimension of each feature vector is C, which is used for representing a feature in the corresponding region.

In operation S640, the server inputs the obtained feature vectors $v_1$ to $v_{14}$ into a fully connected layer, outputs scalars corresponding to the regions, and normalizes the scalars corresponding to the regions, to obtain weights corresponding to the regions.

In an embodiment of the disclosure, a parameter of the fully connected layer may be $W \in R^{c \times 1}$, which indicates that an input dimension of the fully connected layer is C dimensions, and an output dimension thereof is one dimension. After 14 scalars are obtained by using the fully connected layer, the 14 scalars may be normalized, for example, be normalized by using an L1 norm, an L2 norm, or a softmax function, to obtain $\beta_1$ to $\beta_{14}$, so that $\beta_1$ to $\beta_{14}$ respectively represent weights of the feature vectors $v_1$ to $v_{14}$, that is, weights of the regions. By using L1-norm normalization as an example, a weight of a feature vector may be calculated by using the following formula (1):

$$(\beta_1, \beta_2, \ldots, \beta_{14}) = \frac{w^T(v_1, v_2, \ldots, v_{14})}{|w^T v_1| + |w^T v_2| + \ldots + |w^T v_{14}|} \quad \text{Formula (1)}$$

In operation S650, the server dot-multiplies the obtained feature vectors $v_1$ to $v_{14}$ by the corresponding weights $\beta_1$ to $\beta_{14}$ respectively, to obtain weighted feature vectors of the regions.

In an embodiment of the disclosure, weighted feature vectors of the 14 regions may be represented as $\beta_1 v_1$ to $\beta_{14} v_1$ respectively, that is, to perform processing on the image by using a visual attention mechanism. The processing may be implemented in a dot-multiplication manner. A design of the process is simple without requiring addition of a particular neural network layer. The dot-multiplication process is performed only to multiply a region feature vector by a region weight that corresponds thereto.

In operation S660, the server performs summation on the weighted feature vectors of the regions, and performs normalization by using an L2 norm, to obtain a final feature vector of the image. After the feature vector of the image is obtained, processing, for example, image retrieval processing or image recognition processing, may be performed based on the feature vector. In an embodiment of the disclosure, the final feature vector of the image may be calculated by using the following formula (2):

$$V = \frac{\beta_1 \cdot v_1 + \beta_2 \cdot v_2 + \ldots + \beta_{14} \cdot v_{14}}{\|\beta_1 \cdot v_1 + \beta_2 \cdot v_2 + \ldots + \beta_{14} \cdot v_{14}\|_2} \quad \text{Formula (2)}$$

Figure 8:
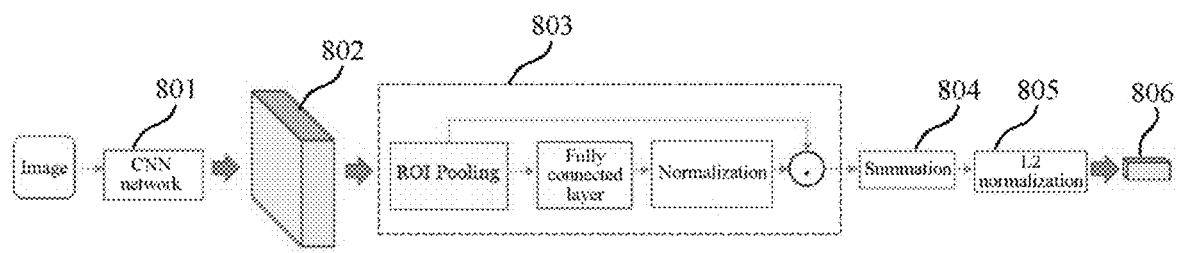
FIG. 8 shows a schematic structural diagram of an image retrieval model according to an embodiment of the disclosure.

In an embodiment of the disclosure, an image retrieval model that may perform peer-to-peer training may be constructed based on the technical solution shown in FIG. 6. FIG. 8 shows a schematic structural diagram of an image retrieval model according to an embodiment of the disclosure. As shown in FIG. 8, the image retrieval model may include a CNN network 801, a visual attention module 803, a summation module 804, and an L2 normalization layer 805. The visual attention module 803 may include an ROI pooling layer, a fully connected layer, a normalization layer, and a dot-multiplication module. The CNN network 801 is configured to perform operation S620 shown in FIG. 6, to obtain a feature map 802; the visual attention module 803 is configured to perform operation S630 to operation S650 shown in FIG. 6; and the summation module 804 and the L2 normalization layer 805 are configured to perform operation S660 shown in FIG. 6, to obtain a feature vector 806 of the image. The image retrieval model may further include a similarity determining module, configured to determine a similarity between different images based on feature vectors of the images, to determine similar images based on the similarity.

In an embodiment of the disclosure, the constructed image retrieval model may be finely adjusted on a classification task, by using a metric learning method, or the like, until a loss function of the image retrieval model converges.

Figure 9:
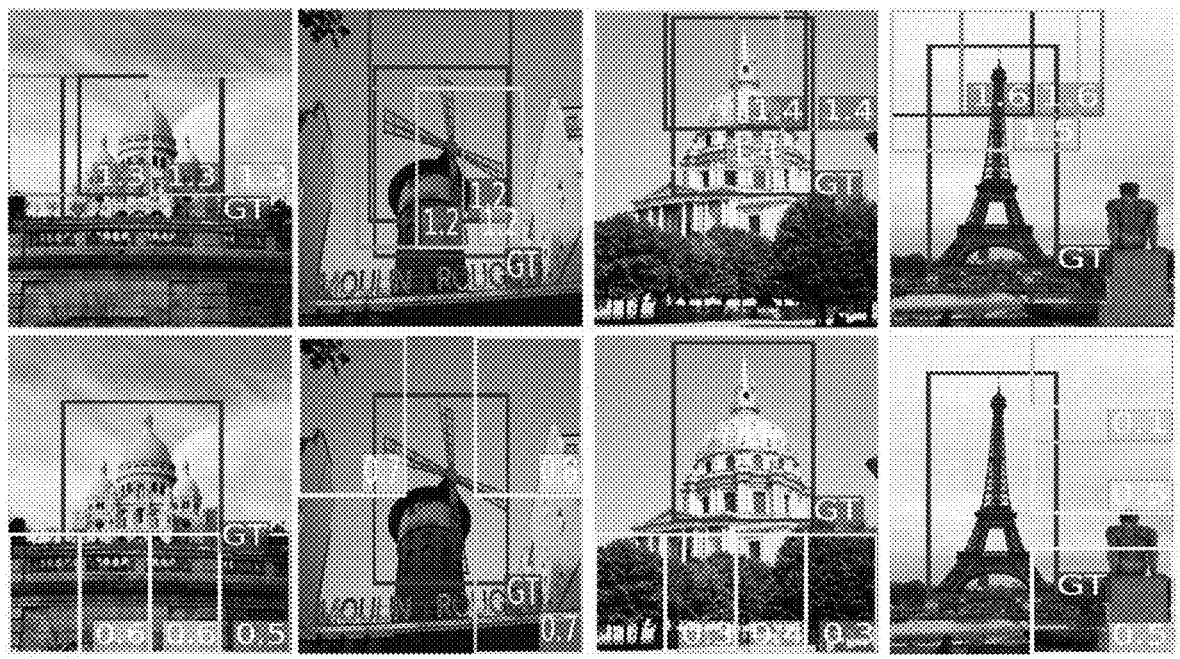
FIG. 9 shows a schematic diagram of weights of regions in an image according to an embodiment of the disclosure.

FIG. 9 shows a schematic diagram of weights of regions in an image according to an embodiment of the disclosure. For ease of description of the effects of the technical solution of an example embodiment of the disclosure, weights of the regions are annotated in the image, illustratively shown in FIG. 9. A box denoted as "GT" shown in FIG. 9 represents a region in which a salient object is located in each image. It can be seen from FIG. 9 that a weight of a region including a salient object is generally relatively large, and a weight of a region including no salient object is generally relatively small. In this way, a feature of a foreground region may be strengthened, and a feature of a background region may be weakened, thereby implementing more appropriate and more accurate image feature encoding, and greatly improving image retrieval performance.

In an embodiment of the disclosure, based on a VGG-16 or ResNet-101 network architecture, test is performed by using image retrieval datasets Paris6k, Oxford5k, Paris106k, and Oxford105k that are commonly recognized in the pertinent art, and a mean average precision (MAP) is used as a quantitative index of a test result. Specific test results are shown in Table 1:

TABLE 1

| Network architecture | Method | Paris 6k | Oxford 5k | Paris 106k | Oxford 105k |
|---|---|---|---|---|---|
| VGG-16 | Related Art | 83.0 | 66.9 | 75.7 | 61.6 |
| | Solution of example embodiment of the disclosure | 86.89 | 74.31 | 81.28 | 71.11 |
| ResNet-101 | Related Art | 85.2 | 69.4 | 77.8 | 63.7 |
| | Solution of example embodiment of the disclosure | 89.47 | 77.26 | 85.16 | 74.95 |

It can be seen from Table 1 that, by using the technical solution of an example embodiment of the disclosure, the quantitative indexes may be effectively improved. Particularly, when the ResNet-101 architecture is selected, the quantitative index is increased by 7.36% on the dataset Paris106k, and the quantitative index is increased by 11.25% on the dataset Oxford105k.

Figure 10:
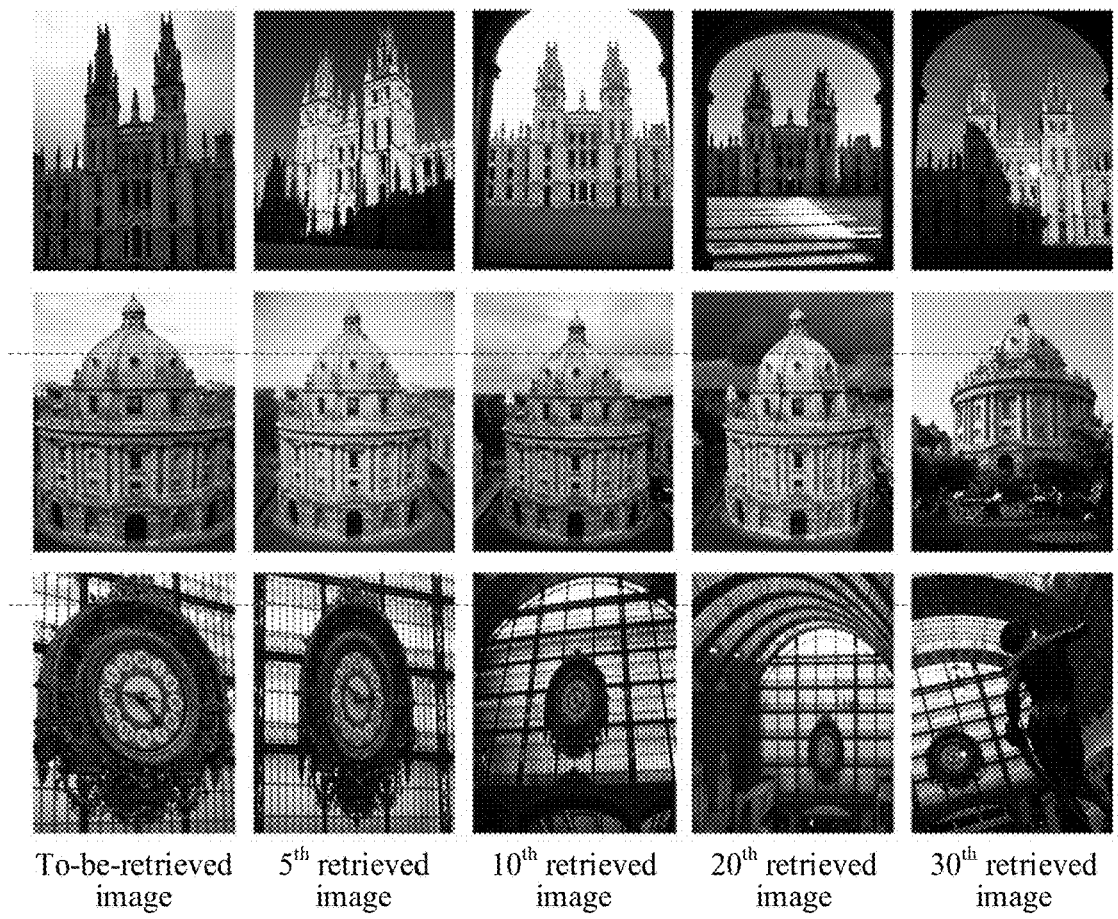
FIG. 10 shows a schematic diagram of image retrieval results according to an embodiment of the disclosure.

To further verify the effect of the technical solution of an example embodiment of the disclosure, after feature vectors of images (or to-be-retrieved images) are extracted according to the technical solution of an example embodiment of the disclosure, retrieval may be performed according to the extracted feature vectors, and then retrieved images are sequentially returned in descending order based on similarity. FIG. 10 shows a schematic diagram of image retrieval results according to an embodiment of the disclosure. The $5^{th}$ returned image, the $10^{th}$ returned image, the $20^{th}$ returned image, and the $30^{th}$ returned image are shown in FIG. 10. It can be seen that, according to the technical solution of an example embodiment of the disclosure, an appropriate and accurate feature is extracted, so that an image including a relatively large non-target region may still be well retrieved.

In addition, the technical solution of an example embodiment of the disclosure is applicable to the image retrieval field and the video retrieval field, and may be specifically applied to similar video recommendation, similar video deduplication, image recommendation or deduplication, and the like.

The following describes apparatus embodiments of the disclosure, and the apparatus embodiments may be used for performing the image processing method in the foregoing embodiments of the disclosure. For details not disclosed in the apparatus embodiments of the disclosure, the foregoing embodiment of the image processing method of the disclosure may be referred to.

Figure 11:
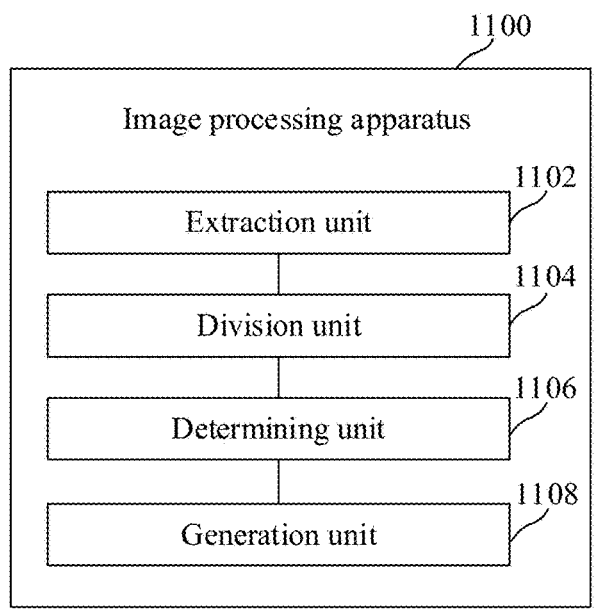
FIG. 11 shows a block diagram of an image processing apparatus according to an embodiment of the disclosure.

FIG. 11 shows a block diagram of an image processing apparatus according to an embodiment of the disclosure.

Referring to FIG. 11, an image processing apparatus 1100 according to an embodiment of the disclosure includes: an extraction unit 1102, a division unit 1104, a determining unit 1106 and a generation unit 1108.

The extraction unit 1102 is configured to extract a feature map of a target image. The division unit 1104 is configured to divide the feature map into a plurality of target regions. The determining unit 1106 is configured to determine weights of the target regions according to feature vectors of the target regions. The generation unit 1108 is configured to generate a feature vector of the target image according to the weights of the target regions and the feature vectors of the target regions.

In some embodiments of the disclosure, the division unit 1104 is configured to: divide the feature map in a predetermined region division manner, to obtain the plurality of target regions; or perform an ROI pooling operation on the feature map, to map ROIs to the feature map to obtain the plurality of target regions.

In some embodiments of the disclosure, the division unit 1104 is configured to: divide the feature map in one or more predetermined region division manners, to obtain feature map regions corresponding to the one or more region division manners; and use the feature map regions corresponding to the one or more region division manners as the target regions.

In some embodiments of the disclosure, the determining unit 1106 is configured to: perform dimension reduction on the feature vectors of the target regions, to obtain feature scalars corresponding to the target regions; and normalize the feature scalars corresponding to the target regions, to obtain the weights of the target regions.

In some embodiments of the disclosure, the determining unit 1106 is configured to: input the feature vectors of the target regions into a fully connected layer of which an output dimension is one dimension, and determine the feature scalars corresponding to the target regions according to an output of the fully connected layer.

In some embodiments of the disclosure, the generation unit 1108 is configured to: calculate weighted feature vectors of the target regions according to the weights of the target regions and the feature vectors of the target regions; and generate the feature vector of the target image according to the weighted feature vectors of the target regions.

In some embodiments of the disclosure, the generation unit 1108 is configured to: combine the weighted feature vectors of the target regions, to obtain the feature vector of the target image; or combine the weighted feature vectors of the target regions, and normalize feature vectors after the combination, to obtain the feature vector of the target image.

In some embodiments of the disclosure, the image processing apparatus 1100 further includes: a retrieval unit, configured to retrieve, according to the feature vector of the target image, an image matching the target image.

Figure 12:
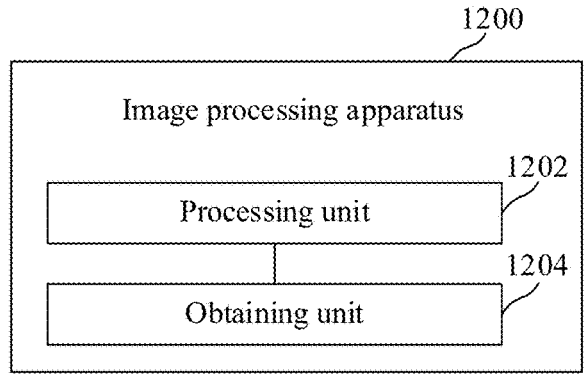
FIG. 12 shows a block diagram of an image processing apparatus according to an embodiment of the disclosure.

FIG. 12 shows a block diagram of an image processing apparatus according to an embodiment of the disclosure.

Referring to FIG. 12, an image processing apparatus 1200 according to an embodiment of the disclosure includes: a processing unit 1202 and an obtaining unit 1204.

The processing unit 1202 is configured to input a target image into an image processing model, the image processing model including a convolution module, a visual attention module, and a feature combination module, the convolution module being configured to extract a feature map of the target image. The visual attention module is configured to: divide the feature map into a plurality of target regions, and determine weights of the target regions according to feature vectors of the target regions. The feature combination module is configured to generate a feature vector of the target image according to the weights of the target regions and the feature vectors of the target regions. The obtaining unit 1204 is configured to obtain the feature vector of the target image that is generated by the image processing model.

In some embodiments of the disclosure, the image processing apparatus 1200 further includes: a training unit, configured to obtain an image sample labeled with a feature vector; and train the image processing model by using the image sample.

In some embodiments of the disclosure, the processing unit 1202 is configured to extract the feature map of the target image by using any convolutional layer in the convolution module.

Figure 13:
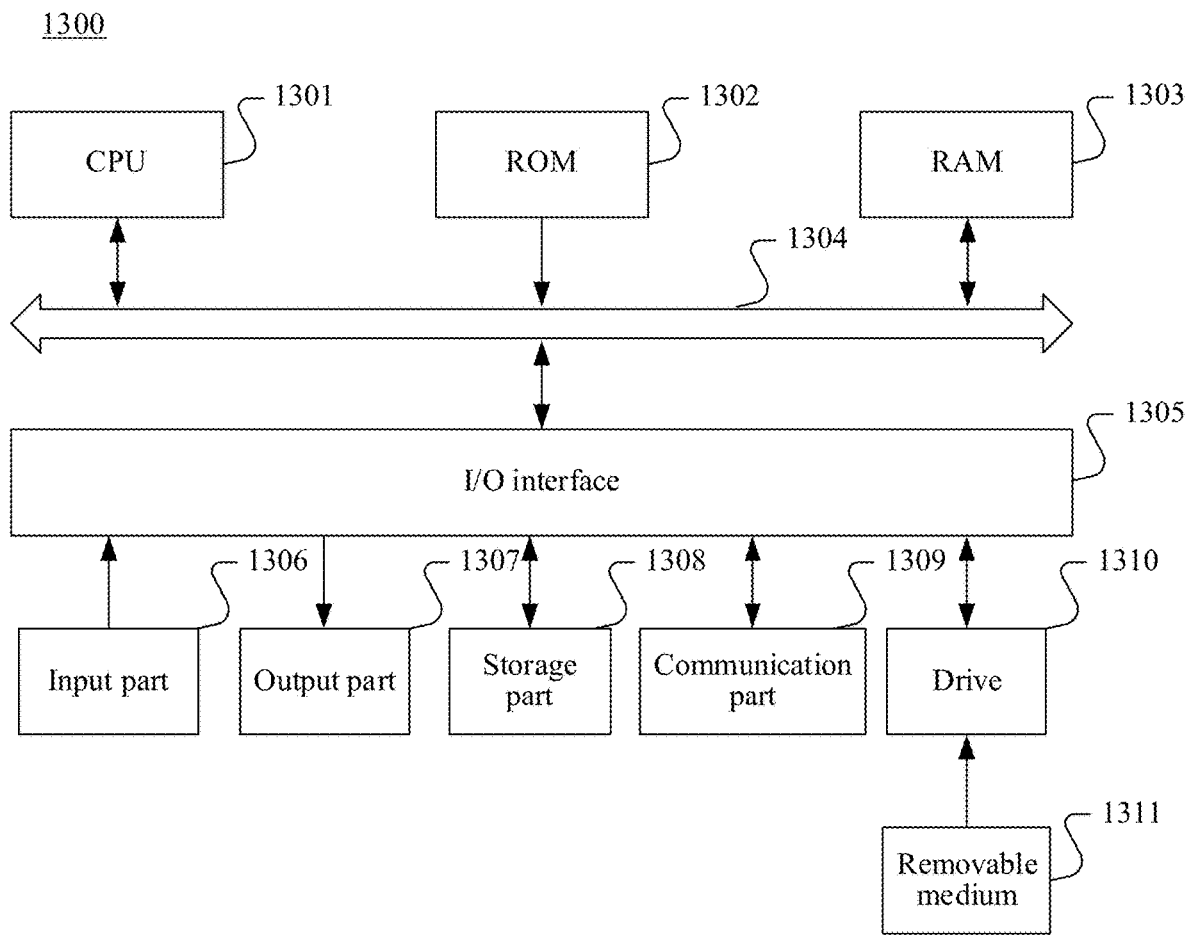
FIG. 13 shows a schematic structural diagram of a computer system adapted to implement an electronic device according to an embodiment of the disclosure.

FIG. 13 is a schematic structural diagram of a computer system adapted to implement an electronic device according to an embodiment of the disclosure.

A computer system 1300 of the electronic device shown in FIG. 13 is merely an example, and does not constitute any limitation on functions and use ranges of the embodiments of the disclosure.

As shown in FIG. 13, the computer system 1300 includes a central processing unit (CPU) 1301, which may perform various suitable actions and processing based on a program stored in a read-only memory (ROM) 1302 or a program loaded from a storage part 1308 into a random access memory (RAM) 1303, for example, perform the method described in the foregoing embodiments. The RAM 1303 further stores various programs and data required for system operations. The CPU 1301, the ROM 1302, and the RAM 1303 are connected to each other by using a bus 1304. An input/output (I/O) interface 1305 is also connected to the bus 1304.

The following components are connected to the I/O interface 1305: an input part 1306 including a keyboard, a mouse, or the like, an output part 1307 including a cathode ray tube (CRT), a liquid crystal display (LCD), a speaker, or the like, a storage part 1308 including a hard disk, or the like, and a communication part 1309 including a network interface card such as a local area network (LAN) card or a modem. The communication portion 1309 performs communication processing by using a network such as the Internet. A driver 1310 is also connected to the I/O interface 1305 as required. A removable medium 1311, such as a magnetic disk, an optical disc, a magneto-optical disk, or a semiconductor memory, is installed on the drive 1310 as required, so that a computer program read from the removable medium is installed into the storage part 1308 as required.

Particularly, according to an embodiment of the disclosure, the processes described in the following by referring to the flowcharts may be implemented as computer software programs. For example, an example embodiment of the disclosure includes a computer program product, the computer program product includes a computer program carried on a computer-readable medium, and the computer program includes program code used for performing the methods shown in the flowcharts. In such an embodiment, the computer program may be downloaded and installed from a network through the communication part 1309, and/or installed from the removable medium 1311. When the computer program is executed by the CPU 1301, the various functions defined in the system of the disclosure are executed.

The computer-readable medium shown in the embodiments of the disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the unit described may also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. According to the implementations of the disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the example implementations described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

In the technical solutions provided in the example embodiments of the disclosure, a feature map of a target image is divided into a plurality of target regions; and weights of the target regions are determined according to feature vectors of the target regions, to generate a feature vector of the target image according to the weights of the target regions and the feature vectors of the target regions. In this way, when the feature vector of the image is determined, the target regions may be weighted according to the feature vectors of the target regions in the image, so that a non-salient region (for example, a background region) in the image may be weakened, and a salient region (for example, a foreground region) in the image may be highlighted, thereby effectively improving accuracy and appropriateness of the generated feature vector of the image, and improving an image retrieval effect.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and practicing the implementations of the disclosure, a person skilled in the art may conceive of other implementations of the disclosure. The disclosure is intended to cover any variations, uses, or adaptive changes of the disclosure. The variations, uses, or adaptive changes follow the general principles of the disclosure and may include common general knowledge or common technical means in the art, which are not disclosed in the disclosure. It is to be understood that the disclosure is not limited to the precise structures described above and shown in the accompanying drawings, and various modifications and changes may be made without departing from the scope of the disclosure, which is subject to the appended claims.

What is claimed is:

1. An image processing method for image recognition, comprising:
   extracting a feature map of a target image;
   dividing the feature map into target regions;
   determining weights of the target regions according to feature vectors of the target regions; and
   generating a feature vector of the target image according to the weights of the target regions and the feature vectors of the target regions, the feature vector being used for image recognition of the target image,
   wherein the determining the weights comprises:
   performing dimension reduction on the feature vectors of the target regions by respectively inputting the feature vectors of the target regions into a fully-connected layer, to obtain feature scalars respectively corresponding to the target regions; and
   normalizing the feature scalars respectively corresponding to the target regions, to obtain the weights of the target regions.

2. The image processing method according to claim 1, wherein the dividing the feature map comprises:
   dividing the feature map in a predetermined region division manner, to obtain the target regions; or
   performing a region of interest (ROI) pooling operation on the feature map, to map ROIs to the feature map to obtain the target regions.

3. The image processing method according to claim 2, wherein the dividing the feature map comprises:
   dividing the feature map by using one or more predetermined region division manners, to obtain, as the target regions, feature map regions obtained by division.

4. The image processing method according to claim 1, wherein the performing the dimension reduction comprises:
   inputting the feature vectors of the target regions into a fully connected layer of which an output dimension is one dimension, and determining the feature scalars corresponding to the target regions according to an output of the fully connected layer.

5. The image processing method according to claim 1, wherein the generating the feature vector comprises:
obtaining weighted feature vectors of the target regions according to the weights of the target regions and the feature vectors of the target regions; and
generating the feature vector of the target image according to the weighted feature vectors of the target regions.

6. The image processing method according to claim 5, wherein the generating the feature vector of the target image according to the weighted feature vectors of the target regions comprises:
combining the weighted feature vectors of the target regions, to obtain the feature vector of the target image; or
combining the weighted feature vectors of the target regions, and normalizing feature vectors after the combination, to obtain the feature vector of the target image.

7. The image processing method according to claim 1, further comprising:
retrieving, according to the feature vector of the target image, an image matching the target image.

8. An image processing method for image recognition, comprising:
inputting a target image into an image processing model, the image processing model comprising a convolution module, a visual attention module, and a feature combination module, the convolution module being configured to extract a feature map of the target image, the visual attention module being configured to: divide the feature map into target regions, and determine weights of the target regions according to feature vectors of the target regions, and the feature combination module being configured to generate a feature vector of the target image according to the weights of the target regions and the feature vectors of the target regions, and
the visual attention module being configured to determine the weights by:
performing dimension reduction on the feature vectors of the target regions by respectively inputting the feature vectors of the target regions into a fully-connected layer, to obtain feature scalars respectively corresponding to the target regions; and
normalizing the feature scalars respectively corresponding to the target regions, to obtain the weights of the target regions; and
obtaining the feature vector of the target image that is generated by the image processing model, the feature vector being used for image recognition of the target image.

9. The image processing method according to claim 8, further comprising:
obtaining an image sample labeled with a feature vector; and
training the image processing model by using the image sample.

10. The image processing method according to claim 8, wherein the feature map of the target image is extracted by using any convolutional layer in the convolution module.

11. An image processing apparatus for image recognition, comprising:
at least one memory configured to store program code; and
at least one processor configured to read the program code and operate as instructed by the program code, the program code comprising:
extraction code configured to cause the at least one processor to extract a feature map of a target image;
division code configured to cause the at least one processor to divide the feature map into target regions;
determining code configured to cause the at least one processor to determine weights of the target regions according to feature vectors of the target regions; and
generation code configured to cause the at least one processor to generate a feature vector of the target image according to the weights of the target regions and the feature vectors of the target regions, the feature vector being used for image recognition of the target image,
wherein the determining code is configured to cause the at least one processor to determine the weights by:
performing dimension reduction on the feature vectors of the target regions by respectively inputting the feature vectors of the target regions into a fully-connected layer, to obtain feature scalars respectively corresponding to the target regions; and
normalizing the feature scalars respectively corresponding to the target regions, to obtain the weights of the target regions.

12. A non-transitory computer-readable medium storing a computer program, the computer program being executable by at least one processor to perform the method according to claim 1.

13. A non-transitory computer-readable medium storing a computer program, the computer program being executable by at least one processor to perform the method according to claim 8.

14. An electronic device, comprising:
at least one processor; and
at least one memory configured to store program code, the program code being executable by the at least one processor to perform the method according to claim 8.

15. An image processing apparatus for image recognition, comprising:
at least one memory configured to store program code; and
at least one processor configured to read the program code and operate as instructed by the program code, the program code comprising:
input code configured to cause the at least one processor to input a target image into an image processing model, the image processing model comprising a convolution module, a visual attention module, and a feature combination module, the convolution module being configured to extract a feature map of the target image, the visual attention module being configured to: divide the feature map into target regions, and determine weights of the target regions according to feature vectors of the target regions, and the feature combination module being configured to generate a feature vector of the target image according to the weights of the target regions and the feature vectors of the target regions, and
the visual attention module being configured to determine the weights by:
performing dimension reduction on the feature vectors of the target regions by respectively inputting the feature vectors of the target regions into a fully-connected layer, to obtain feature scalars respectively corresponding to the target regions; and normalizing the feature scalars respectively corresponding to the target regions, to obtain the weights of the target regions; and obtaining code configured to cause the at least one processor to obtain the feature vector of the target image that is generated by the image processing model.

\* \* \* \* \*